United States Patent
Ono et al.

(10) Patent No.: US 8,073,283 B2
(45) Date of Patent: Dec. 6, 2011

(54) NOISE ELIMINATION APPARATUS AND NOISE ELIMINATION METHOD

(75) Inventors: Midori Ono, Tokyo (JP); Shinichi Hattori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 778 days.

(21) Appl. No.: 12/224,135

(22) PCT Filed: Apr. 7, 2006

(86) PCT No.: PCT/JP2006/307496
§ 371 (c)(1),
(2), (4) Date: Aug. 19, 2008

(87) PCT Pub. No.: WO2007/116514
PCT Pub. Date: Oct. 18, 2007

(65) Prior Publication Data
US 2009/0028457 A1    Jan. 29, 2009

(51) Int. Cl.
*G06K 9/40* (2006.01)
(52) U.S. Cl. .............. 382/261; 382/275; 348/607
(58) Field of Classification Search ............. 382/261, 382/275; 341/200; 375/240.16, 243, 240, 375/240.03; 348/402.1, 415.1, 409.1, 607
See application file for complete search history.

(56) References Cited

U.S. PATENT DOCUMENTS

| 4,179,710 A | 12/1979 | Ishiguro et al. |
| 4,236,224 A | 11/1980 | Chang |
| 4,727,506 A | 2/1988 | Fling |
| 4,926,361 A | 5/1990 | Ohtsubo et al. |
| 5,487,086 A * | 1/1996 | Bhaskar ............... 375/243 |
| 5,719,793 A | 2/1998 | Nitta et al. |
| 6,282,243 B1 * | 8/2001 | Kazui et al. ............ 375/240.16 |
| 6,664,913 B1 * | 12/2003 | Craven et al. .............. 341/200 |

FOREIGN PATENT DOCUMENTS

| GB | 2023365 A | 12/1979 |
| JP | 6-225178 A | 8/1994 |
| JP | 7-170429 A | 7/1995 |
| JP | 10-126688 A | 5/1998 |
| JP | 2000-22991 A | 1/2000 |
| JP | 2000-152036 A | 5/2000 |
| JP | 2002-94833 A | 3/2002 |
| JP | 2004-328206 A | 11/2004 |

* cited by examiner

*Primary Examiner* — Jon Chang
(74) *Attorney, Agent, or Firm* — Birch, Stewart, Kolasch & Birch, LLP

(57) ABSTRACT

A noise elimination apparatus has a subtracting section 11 for obtaining a difference value between input image data and reference image data; a calculation processing section 12a for performing calculation processing of multiplying the difference value by a prescribed coefficient; an adaptive integerization processing section 13a for obtaining an integerized difference value by adaptively performing rounding up processing or rounding down processing on the difference value having undergone the calculation processing; an adding section 14 for obtaining output image data from the integerized difference value and the reference image data; and a frame memory 15 for storing the output image data as the reference image data.

8 Claims, 10 Drawing Sheets

|  |  | Rounding Down | Rounding Up |
|---|---|---|---|
| 101 | $f_t$ | \multicolumn{2}{c|}{$x+1$} |
| 102 | $F_{t-1}$ | \multicolumn{2}{c|}{$x$} |
| 103 | $d=f_t-F_{t-1}$ | \multicolumn{2}{c|}{1} |
| 104 | $d'=d \times \alpha$ | 0.25 | ($\alpha=1/4$) |
| 105 | $d''=int(d')$ | 0 | 1 |
| 106 | $F_t=F_{t-1}+d''$ | $x$ | $x+1$ |

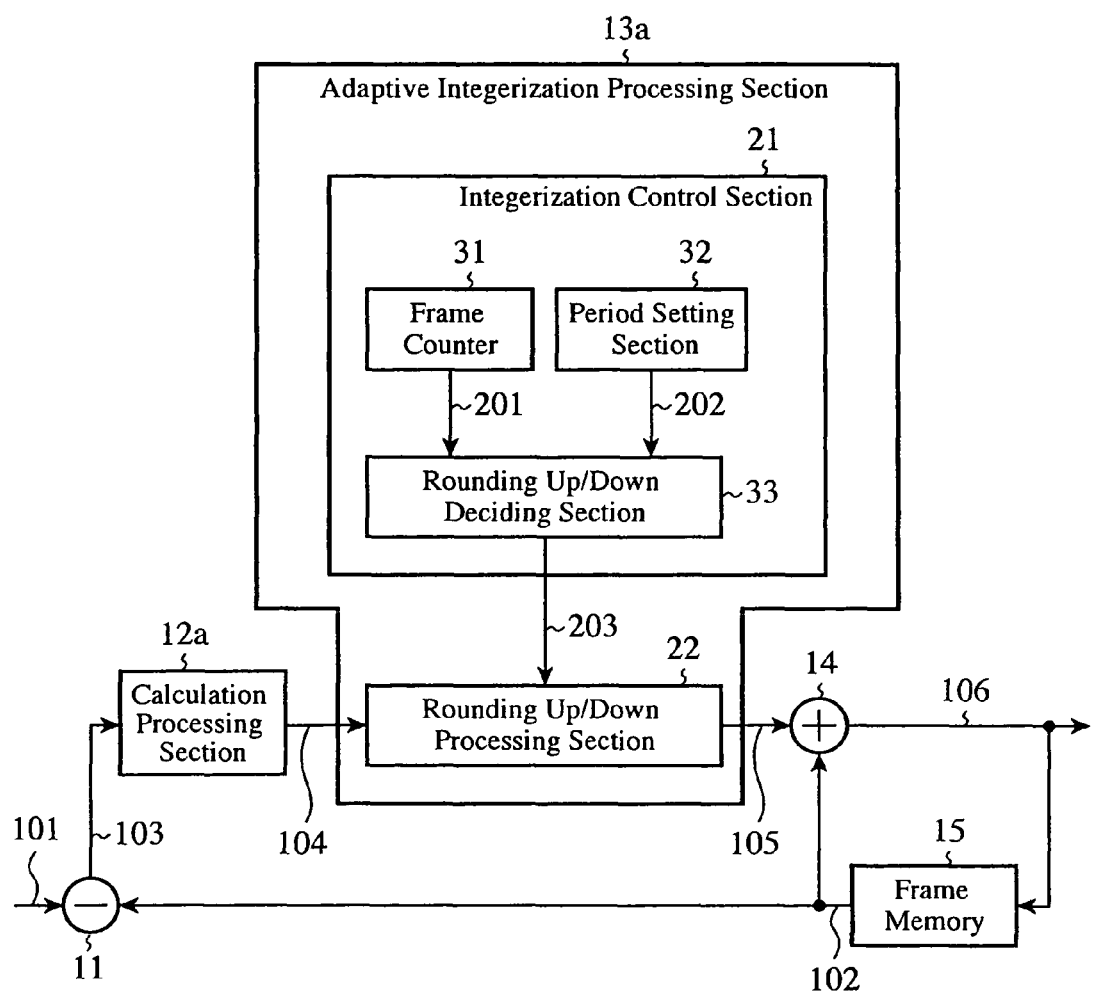

| 101 | $f_t$ | x+1 | | | |
|---|---|---|---|---|---|
| 102 | $F_{t-1}$ | x | | | |
| 103 | $d = f_t - F_{t-1}$ | 1 | | | |
| 104 | $d' = d \times \alpha$ | 0.25 ($\alpha = 1/4$) | | | |
| 302 | $C_{t-1}$ | 0.00 | 0.25 | 0.50 | 0.75 |
| 303 | $d' + C_{t-1}$ | 0.25 | 0.50 | 0.75 | 1.00 |
| 304 | $C_t$ | 0.25 | 0.50 | 0.75 | 0.00 |
| 105 | $d'' = int(d' + C_{t-1})$ | 0 | | | 1 |
| 106 | $F_t = F_{t-1} + d''$ | x | | | x+1 |

NOISE ELIMINATION APPARATUS AND NOISE ELIMINATION METHOD

TECHNICAL FIELD

The present invention relates to a noise elimination apparatus and noise elimination method for removing noise of a video signal.

BACKGROUND ART

A conventional noise elimination apparatus attenuates the interframe difference of a video signal at a ratio determined in accordance with conditions, and removes noise contained in the difference values. For example, in Patent Document 1, a motion deciding unit detects motion according to values based on the difference values to determine a ratio K (0<K<1), and obtains pixel values by adding previous frame pixel values multiplied by the ratio K and input pixel values multiplied by the ratio (1−K), thereby obtaining pixel values that attenuate noise contained in the interframe differences. Such a processing section is referred to as a noise elimination filter.

For example, as shown in the Patent Document 1, the conventional noise elimination apparatus applies the input pixel values and the previous frame pixel values to noise elimination calculation processing based on a ratio of (1−K): K. In other words, assume that the frame number proceeds with the time elapsed, and that the input pixel value (input image) of a given frame number t in the noise elimination processing is $f_t$, and the pixel value after the noise elimination is $F_t$, then $F_t$ is given by the following expression (1). Here, the frame number t is assumed to be an integer, and $F_{t-1}$ designates a pixel value (reference image) of the previous frame after the noise elimination.

$$F_t = (1-K) \cdot f_t + K \cdot F_{t-1} \qquad (1)$$

Although not described in the Patent Document 1, the video signal is generally handled in terms of integers. Accordingly, assuming that int(x) is an integerization function for integerizing a real number x, the integerized pixel value $F_t$ after the noise elimination is given by the following expression (2).

$$F_t = int((1-K) \cdot f_t + K \cdot F_{t-1}) \qquad (2)$$

In this case, since both $F_{t-1}$ and $F_t$ are integers, the foregoing expression (2) can be rewritten as the following expression (3) which is expressed as the sum of the integerized pixel value $F_{t-1}$ after the noise elimination of the previous frame and the value (referred to as "output difference value") obtained by multiplying the difference value $(f_t - F_{t-1})$ between the input pixel value and the previous frame pixel value by the ratio (1−K).

$$F_t = F_{t-1} + int((1-K) \cdot (f_t - F_{t-1})) \qquad (3)$$

FIG. 1 and FIG. 2 are diagrams each showing an example of nonlinear characteristics of an integerization function applied portion for the difference value $(f_t - F_{t-1})$ between the input pixel value $f_t$ and the previous frame pixel value $F_{t-1}$ in the foregoing expression (3). In FIG. 1 and FIG. 2, the horizontal axis represents the difference value $(f_t - F_{t-1})$ between the input pixel value and the previous frame pixel value. Here, the noise elimination is implemented by switching, as to the difference value $(f_t - F_{t-1})$, the ratio (1−K) between an interval near zero where even minute noise is perceivable and intervals on both sides of the interval near zero, where the minute noise has little effect and is hard to be perceived. Here, the following description will be made on the assumption that the noise near zero is eliminated.

For example, in FIG. 1 and FIG. 2, the interval in which the absolute value of the difference value $(f_t - F_{t-1})$ is equal to or less than four is defined as the interval near zero. In this interval, (1−K) is set at 1/4, and in the intervals in which the absolute value of the difference value is greater than four, (1−K) is set at one. In this case, the calculation results of the real number $(1-K) \cdot (f_t - F_{t-1})$ are shown in broken lines.

The integerization function int(x) includes integerization based on the rounding down processing and rounding up processing, and FIG. 1 shows a case of integerization based on the rounding down processing, where as FIG. 2 shows a case of integerization based on the rounding up processing. For the real number calculation results shown by broken lines, the integer values $int((1-K) \cdot (f_t - F_{t-1}))$ are represented by solid lines. In actuality, since the difference value $(f_t - F_{t-1})$ is an integer, they have values only on lattice points whose values on the horizontal axis are integers. It is assumed that open circles do not include the endpoints, whereas solid circles include the endpoints. As shown in FIG. 1 and FIG. 2, depending on whether the integerization is carried out according to the rounding down processing or to the rounding up processing, different noise elimination characteristics are obtained.

First, removal of minute noise will be described in the case where the integerization is carried out by the rounding down processing and rounding up processing. FIG. 3 is a diagram showing an example of percentages of the difference values $(f_t - f_{t-1})$ between corresponding input pixel values in consecutive frames to the component pixel numbers of respective frames when a fixed camera takes a photograph of an object at rest. Generally, some difference takes place in the input pixels because of addition of input system noise to the input pixels. In the example of FIG. 3, it is shown that pixels with the difference of magnitude 2 are 20%, pixels with the difference of magnitude 1 are 30%, and pixels without the difference of magnitude 0 are remaining 50%, and that the percentages are nearly constant.

With respect to FIG. 3, the minute noise removal characteristics will be described when the integerization is carried out using the rounding down processing shown in FIG. 1 as the integerization function.

When the difference values $(f_t - f_{t-1})$ between the corresponding input pixel values of consecutive frames take place with the percentages as shown in FIG. 3, the percentage of the difference values $(F_t - F_{t-1})$ between pixel values of the consecutive frames after the noise elimination will become as shown in FIG. 4 by performing integerization based on the rounding down processing. As shown in FIG. 1, in the case of carrying out integerization by the rounding down processing when 1−K=1/4, since the pixels with the difference values $(f_t - F_{t-1})$ of magnitude 1 or 2 become zero through the calculation processing of $int((1-K) \cdot (f_t - F_{t-1}))$, the foregoing expression (3) yields $F_t = F_{t-1}$. Accordingly, as shown in FIG. 4, the difference values $(F_t - F_{t-1})$ between the corresponding pixel values of the consecutive frames after the noise elimination become all zero, thereby eliminating noise.

Next, with respect to FIG. 3, the minute noise removal characteristics will be described when the integerization is carried out using the rounding up processing shown in FIG. 2 as the integerization function.

When the difference values $(f_t - f_{t-1})$ between the corresponding input pixel values of consecutive frames take place with the percentages as shown in FIG. 3, the percentages of the difference values $(F_t - F_{t-1})$ between pixel values of the consecutive frames after the noise elimination will become as shown in FIG. 5 by performing integerization based on the rounding up processing. As shown in FIG. 2, in the case of carrying out integerization by the rounding up processing when 1−K=1/4, since the pixels with the difference values $(f_t-F_{t-1})$ of magnitude 1 or 2 become 1 through the calculation processing of $int((1-K)\cdot(f_t-F_{t-1}))$, the foregoing expression (3) yields $F_t=F_{t-1}+1$. Accordingly, as shown in FIG. 2, the difference values $(F_t-F_{t-1})$ with magnitude 2 between the corresponding pixel values of the consecutive frames after the noise elimination become all 1, thereby leaving some noise without eliminating completely, although the noise of the frame is reduced as a whole.

The foregoing is the description about the effect on the removal of minute noise due to the difference between the rounding down processing and the rounding up processing in the integerization.

Next, the effect on the removal of minute noise due to the difference between the rounding down processing and the rounding up processing in the integerization will be described in the case where a screen gradually makes a transition from a certain still image to another different still image because of transition such as a dissolve in a conventional noise elimination apparatus. It is assumed here that (1−K) in the integerization function in the foregoing expression (3) is 1/4 when the absolute value of the difference value $(f_t-F_{t-1})$ is equal to or less than four, and is one when it exceeds four as in FIG. 1 and FIG. 2.

FIG. 6 is a graph showing an example of the input pixel values $f_t$ of the image data at any given frame number t and of the pixel values $F_t$ having undergone the noise elimination. In the graph at the top of FIG. 6, crosses denote the input pixel values $f_t$ whose magnitude varies one by one from zero to eight over eight frames from t=5 to t=12, thereby making a transition to another still image. This example will be described.

First, a case that applies the rounding down processing shown in FIG. 1 as the integerization function will be described. The output pixel values $F_t$ corresponding to the input pixel values $f_t$ make transition as denoted by squares in the graph at the top of FIG. 6. The difference values $(f_t-F_{t-1})$ in the course of the transition are denoted by squares in the graph at the bottom of FIG. 6.

In the graph at the bottom of FIG. 6, $int((1-K)\cdot(f_t-F_{t-1}))$ in the foregoing expression (3), which is an increment from the output pixel value $F_{t-1}$ of the previous frame, is obtained by multiplying the differences denoted by the squares by (1−K), that is, by 1/4, followed by integerization by the rounding down processing. Accordingly, in the range from t=8 to t=12 in which the difference values $(f_t-F_{t-1})$ take four, the increment becomes one. In this case, the output pixel values $F_t$ in the graph at the top of FIG. 6 increase one by one up to five. In the ranges of t<8 and t>12 in which the difference values $(f_t-F_{t-1})$ are less than four, the increment becomes zero so that the output pixel values $F_t$ in the graph at the top of FIG. 6 do not increase.

At t=12, the transition of the input pixel values $f_t$ ends. The difference values with magnitude 4 up to t=12 become magnitude 3 at t=13 at which they are changed to reduce. From that point on, although the difference values are considered to be minute noise and are eliminated, the output pixel values $F_t$ never exceed five and end the transition with being maintained at five, which is perceived as afterimages.

Next, a case that applies the rounding up processing shown in FIG. 2 as the integerization function will be described. The output pixel values $F_t$ corresponding to the input pixel values $f_t$ make transition as denoted by circles in the graph at the top of FIG. 6. The difference values $(f_t-F_{t-1})$ in the course of the transition are denoted by circles in the graph at the bottom of FIG. 6.

In the graph at the bottom of FIG. 6, $int((1-K)\cdot(f_t-F_{t-1}))$ in the foregoing expression (3), which is an increment from the output pixel value $F_{t-1}$ of the previous frame, is obtained by multiplying the differences denoted by the circles by (1−K), that is, by 1/4, followed by integerization by the rounding up processing. Accordingly, in the range from t=5 to t=12 in which the difference values $(f_t-F_{t-1})$ take one, the increment becomes one. In this case, the output pixel values $F_t$ in the graph at the top of FIG. 6 increase one by one up to eight with taking the same values as the input pixel values $f_t$ denoted by the crosses. Thus, any afterimage is not perceived.

Furthermore, a case that applies the integerization function when the difference between the input pixel values and the output pixel values of the previous frame is equal to or greater than two will be described. In the case of applying the rounding down processing shown in FIG. 1 as the integerization function, afterimages will be perceived because the output pixel values $F_t$ cannot make a transition up to the same value as the input pixel value at the end of the transition as in the case where the difference is one.

Likewise, in the case where the rounding up processing shown in FIG. 2 is applied as the integerization function at the time when the difference between the input pixel values is equal to or greater than two, although the transition begins simultaneously with the start of the transition of the input pixel value, an increment of the difference is reduced because the difference is multiplied by (1−K). Thus, although they do not take the same values as in the transition process when the difference is one, since the output pixel values $F_t$ can make transition up to the same value as the end value of the transition of the input pixel values, no afterimage is perceived.

Here, the description is made by way of example of the dissolve that makes a linear transition with the difference of constant magnitude. However, a similar phenomenon can be confirmed as to the minute noise even in the nonlinear transition with the difference of variable magnitude.

As described above, when applying as the integerization function the rounding down processing to the calculation processing of the noise elimination, although the conventional noise elimination apparatus can eliminate minute noise, afterimages are sometimes perceived. On the other hand, when applying the rounding up processing as the integerization function, although it can prevent afterimages from being perceived, it cannot sometimes eliminate the minute noise.

Patent Document 1: Japanese Patent Laid-Open No. 6-225178/1994 (Paragraph 0013, FIGS. 1 and 6).

With the foregoing configuration, the conventional noise elimination apparatus has a problem of being unable to achieve the removal of minute noise and the elimination of afterimages at the same time.

The present invention is implemented to solve the foregoing problem. Therefore it is an object of the present invention to provide a noise elimination apparatus and noise elimination method capable of removing the minute noise and eliminating afterimages at the same time.

DISCLOSURE OF THE INVENTION

A noise elimination apparatus in accordance with the present invention includes: a subtracting section for obtaining a difference value between input image data and reference image data; a calculation processing section for carrying out calculation processing of multiplying the difference value obtained by the subtracting section by a prescribed coefficient; an adaptive integerization processing section for obtaining an integerized difference value by adaptively performing rounding up processing or rounding down processing on the difference value having undergone the calculation processing by the calculation processing section; an adding section for obtaining output image data on the basis of the integerized difference value obtained by the adaptive integerization processing section and the reference image data; and a memory for storing the output image data obtained by the adding section as the reference image data.

The noise elimination apparatus in accordance with the present invention has an advantage of being able to remove minute noise and eliminate afterimages at the same time.

BRIEF DESCRIPTION OF THE DRAWINGS

FIG. 7 is a block diagram showing a configuration of a noise elimination apparatus of an embodiment 1 in accordance with the present invention;

FIG. 8 is a diagram showing instructions which are decision results of a rounding up deciding section of the noise elimination apparatus of the embodiment 1 in accordance with the present invention;

BEST MODE FOR CARRYING OUT THE INVENTION

Figure 1:
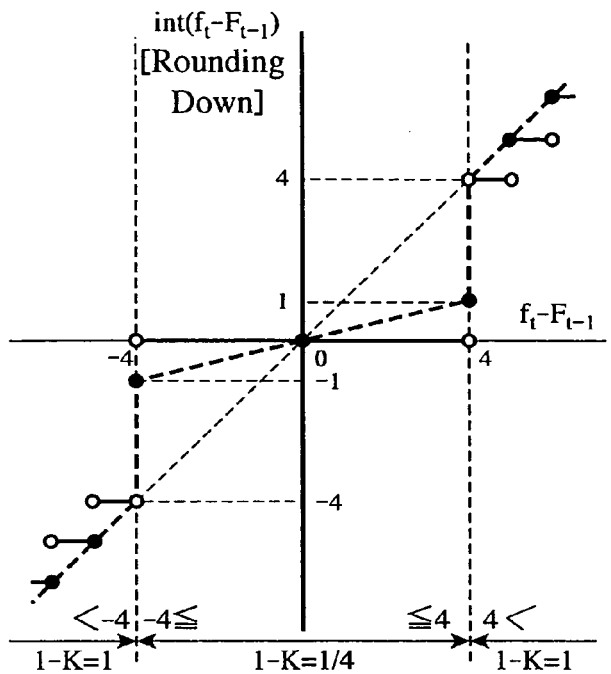
FIG. 1 is a diagram showing an example of characteristics of an integerization function based on rounding down processing of difference values between input pixels and a previous frame.

The best mode for carrying out the invention will now be described with reference to the accompanying drawings to explain the present invention in more detail.

Embodiment 1

In the embodiment 1 in accordance with the present invention, a noise elimination apparatus will be described which includes an adaptive integerization processing section for adaptively selecting and applying one of the rounding down processing and rounding up processing as the integerization function for real values resulting from the calculation processing of the noise elimination.

FIG. 7 is a block diagram showing a configuration of the noise elimination apparatus of the embodiment 1 in accordance with the present invention. The noise elimination apparatus comprises a subtracting section 11, a calculation processing section 12a, an adaptive integerization processing section 13a, an adding section 14 and a frame memory 15.

The adaptive integerization processing section 13a includes, as a more detailed internal configuration, an integerization control section 21 having a frame counter 31, a period setting section 32, and a rounding up/down deciding section 33; and a rounding up/down processing section 22.

Referring to FIG. 7, the operation of the noise elimination apparatus having the adaptive integerization processing section 13a in the embodiment 1 in accordance with the present invention will be described.

The subtracting section 11 takes differences, at the corresponding positions, between image data ($f_t$) 101 of a frame which is an input image and image data ($F_{t-1}$) 102 of a first previous frame which is stored in the frame memory 15 as a reference image, and outputs ($f_t-F_{t-1}$) as difference values (d) 103 including noise components.

Figure 2:
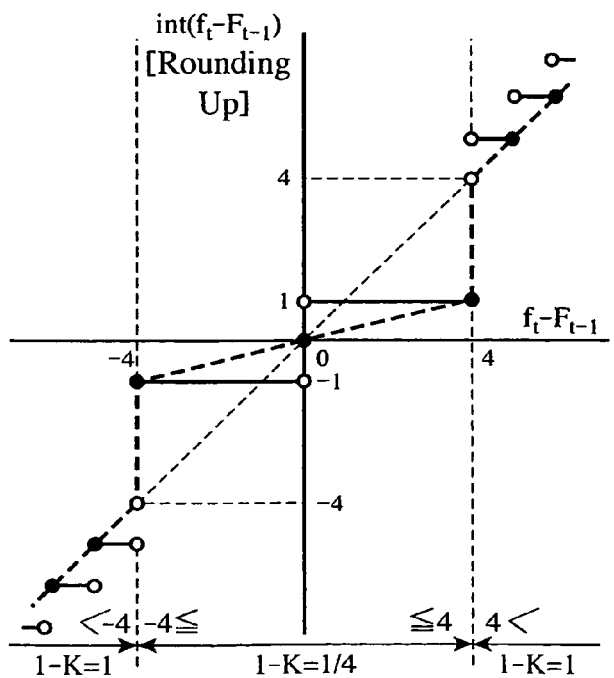
FIG. 2 is a diagram showing an example of characteristics of an integerization function based on rounding up processing of difference values between input pixels and a previous frame.
Figure 3:
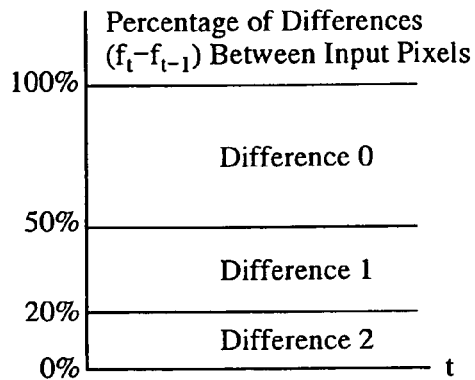
FIG. 3 is a diagram showing an example of percentages of difference values between input pixels and a previous frame, with which percentages a frame is occupied.
Figure 4:
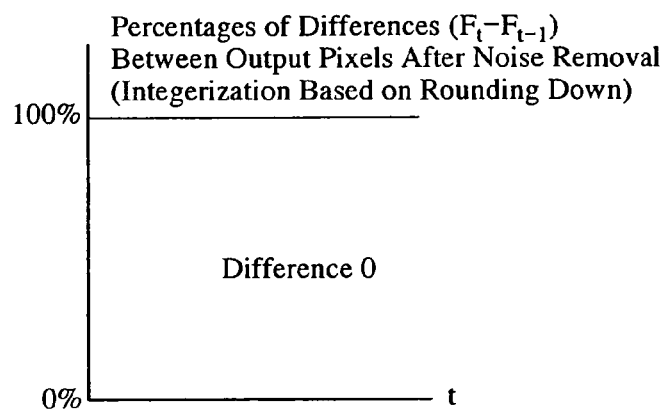
FIG. 4 is a diagram showing the percentage of difference values between output pixels and previous frame pixels occupying a frame, from which noise is eliminated by integerization based on rounding down processing for the input of FIG. 3.
Figure 5:
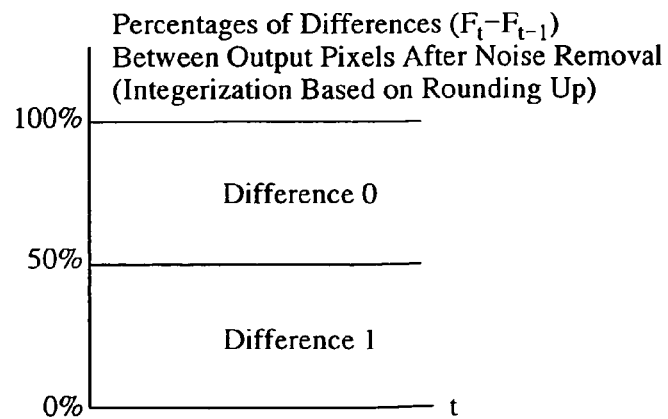
FIG. 5 is a diagram showing the percentages of difference values between output pixels and previous frame pixels occupying a frame, from which noise is eliminated by integerization based on rounding up processing for the input of FIG. 3.

The calculation processing section 12a outputs a difference value (d') 104 having undergone the noise elimination calculation processing by multiplying the difference value (d) 103 output from the subtracting section 11 by a prescribed coefficient α corresponding to (1−K) of the foregoing expression (3) described in the background art. Although the calculation processing section 12a can employ various types of noise elimination calculation processing, it is assumed here that it carries out calculation having nonlinear characteristics, and the description will be made by applying the characteristics as shown in FIG. 1 and FIG. 2.

First, when the difference value (d) 103 is a target value of the noise elimination, that is, when the absolute value of the difference value (d) 103 is equal to or less than the threshold 4 in accordance with the threshold 4 in the nonlinear characteristics, the calculation processing section 12a obtains the difference value (d') 104 having undergone the calculation processing of multiplying the prescribed coefficient α as shown in the following expression (4).

$$d' = \alpha \times d \quad (4)$$

In this way, the calculation processing section 12a multiplies the difference value (d) 103 which is a noise component to be eliminated by the prescribed coefficient α less than one (0<α<1), 1/4 in this example, thereby carrying out the noise elimination calculation processing.

In contrast, when the difference value (d) 103 is a value outside the noise elimination target, that is, when the absolute value of the difference value (d) 103 is greater than the threshold 4 in accordance with the threshold 4, the calculation processing section 12a obtains the difference value (d') 104 having undergone the calculation processing that multiplies the difference value (d) 103 by the prescribed coefficient α=1 in accordance with the foregoing expression (4). In this case, however, since the noise elimination calculation processing is substantially unnecessary, it is also possible to output the integer difference value (d) 103 with considering it as the real number difference value (d') 104.

As for the prescribed coefficient α and the threshold in the nonlinear characteristics, they can be set independently of each other.

The adaptive integerization processing section 13a performs the adaptive integerization which will be described below on the difference value (d') 104 on which the calculation processing section 12a carries out the noise elimination calculation processing, and outputs an integerized difference value (int(d')) 105.

The adding section 14 adds the integerized difference value (int(d')) 105 output from the adaptive integerization processing section 13a and the reference image data ($F_{t-1}$) 102 of the first previous frame stored in the frame memory 15 to obtain output image data ($F_t$) 106 having undergone the noise elimination. The frame memory 15 stores the output image data ($F_t$) 106 having undergone the noise elimination.

In this way, the noise elimination apparatus with the adaptive integerization processing section 13a in the embodiment 1 in accordance with the present invention operates. Here, the detailed operation of the adaptive integerization processing section 13a will be described.

The adaptive integerization processing section 13a comprises the integerization control section 21 and the rounding up/down processing section 22. The rounding up/down processing section 22 carries out the adaptive integerization which will be described below on the difference value (d') 104 which has undergone the noise elimination calculation processing and is input to the adaptive integerization processing section 13a, and outputs the integerized difference value (int (d')) 105 as the output of the adaptive integerization processing section 13a.

First, the frame counter 31 of the integerization control section 21 is a counter for counting up frame by frame input, and for outputting a count value (t) 201 of the frame.

The period setting section 32 of the integerization control section 21 has a period (N) 202 set for carrying out the rounding up processing, and outputs it. The period (N) 202 set in the period setting section 32 can be set in advance or set from outside such as a CPU (not shown).

Incidentally, although the description will be made in the assumption that the count value (t) 201 of the frame counter 31 is the same as the frame number t, the count value 201 can be set independently of the frame number to perform counting.

The rounding up/down deciding section 33 of the integerization control section 21 receives as its input the count value (t) 201 of the frame counted by the frame counter 31 and the period (N) 202 for carrying out the rounding up processing output from the period setting section 32; and provides the rounding up/down processing section 22 with the instruction 203 on the integerization function to be applied so that it carries out the rounding up processing when the count value (t) 201 of the frame to be subjected to the processing is divisible by the period (N) 202 for carrying out the rounding up processing, whereas it carries out the rounding down processing for an indivisible frame.

FIG. 8 is a diagram showing an example of the instruction 203, which is the decision result of the rounding up/down deciding section 33, when the period (N) 202 for carrying out the rounding up processing is four. As shown in FIG. 8, when the period (N) 202 is four and the frame counter 31 counts up from the count value (t) 201 of zero, the rounding up/down deciding section 33 outputs the instruction 203 for the rounding up processing when the count value (t) 201 is divisible by the period 202 (N=4), that is, t=0, 4, 8, . . . , and outputs the instruction 203 for the rounding down processing in the other cases.

According to the instruction 203 given by the rounding up/down deciding section 33, the rounding up/down processing section 22 carries out the adaptive integerization that applies the rounding up processing or rounding down processing to the difference value (d') 104 having undergone the noise elimination calculation processing by the calculation processing section 12a, and outputs the integerized difference value (int(d')) 105.

In this way, in the integerization control section 21, the rounding up/down deciding section 33 and the rounding up/down processing section 22 carry out the integerization processing as indicated by the following expression (5) on the basis of the relationships between the count value (t) 201 and period (N) 202 of the frame.

$$\text{int}(d') = \begin{cases} \lceil d' \rceil & \text{if } t \bmod N = 0 \\ \lfloor d' \rfloor & \text{otherwise} \end{cases} \quad (5)$$

In accordance with the upper equation of the foregoing expression (5), the rounding up/down deciding section 33 instructs to select and apply the rounding up processing if a remainder of the division of the count value (t) 201 of the frame by the period (N) 202 is zero, and the rounding up/down processing section 22 instructed to carry out the rounding up processing selects the rounding up processing and performs the integerization processing. On the other hand, in accordance with the lower equation of the foregoing expression (5), the rounding up/down deciding section 33 instructs to select and apply the rounding down processing if a remainder of the division of the count value (t) 201 of the frame by the period (N) 202 is other than zero, and the rounding up/down processing section 22 instructed to carry out the rounding down processing selects the rounding down processing and performs the integerization processing.

Here, although the rounding up processing is applied when the remainder of the division of the count value (t) 201 by the period (N) 202 is zero in the foregoing expression (5) and FIG. 8, this is not essential. Since the instruction 203 for the rounding up processing should be output at every period (N) 202, it is not necessary that the remainder is zero. Thus, it is also possible that the instruction for the rounding up processing is output when the remainder equals a prescribed integer from zero to (N−1).

Figure 9:
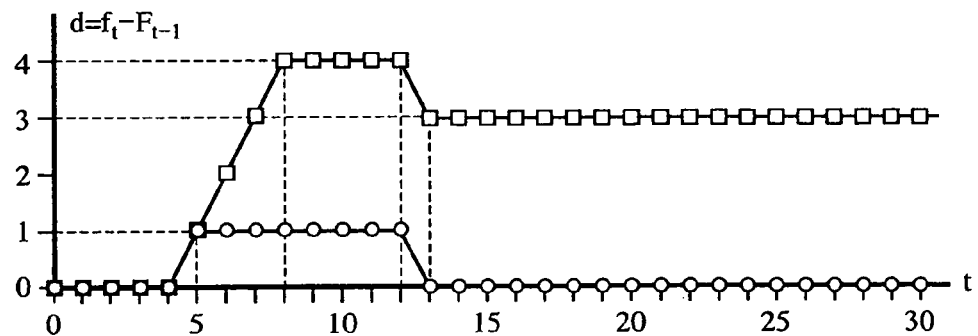
FIG. 9 is a diagram showing output process for input when the difference value is one in the noise elimination apparatus of the embodiment 1 in accordance with the present invention.

Next, the operation at the time when noise with magnitude 1 occurs in the image data at any given frame number t will be described with reference to FIG. 9. For convenience of description, it is assumed that the input image data $f_t$ is (x+1) and the reference image data $F_{t-1}$ is x (x is an integer). The difference value (d) 103 at the subtracting section 11, which is equal to ($f_t-F_{t-1}$), becomes one, and has undergone the calculation processing in accordance with the nonlinear characteristics. When the coefficient α equals 1/4, the calculation processing section 12a outputs 0.25 as the difference value (d') 104 that has undergone the noise elimination calculation processing by the foregoing expression (4) because the difference value (d) 103 is one.

Since the period (N) 202 of the rounding up processing is four, the rounding up/down deciding section 33 outputs the instruction 203 for the rounding up processing at the percentage of 1/N, that is, 1/4. As the integerized difference value (d") 105, the output of the rounding up/down processing section 22, one is output at a ratio 1/4 of applying the rounding up processing in the total integerization processing, and the output image $F_t$ having undergone the noise elimination becomes (x+1), thereby noise remains behind. However, at the ratio (N−1)/N of applying the rounding down processing, that is, 3/4, zero is output as the integerized difference value (d") 105, and the output image $F_t$ having undergone the noise elimination becomes x, thereby being able to eliminate the noise. In this manner, when the period (N) 202 of the rounding up processing is four, the minute noise can be eliminated at the ratio of 3/4. The noise can be eliminated at a higher ratio with an increase in the period (N) 202 for carrying out the rounding up processing. For example, when the period (N) 202 is eight, the minute noise can be eliminated at a ratio of 7/8.

The foregoing is the description about the removal of the minute noise by the adaptive integerization in the embodiment 1 in accordance with the present invention.

Next, the effect of the adaptive integerization on the removal of minute noise will be described when shifting from a certain still image to another different still image in the transition such as a dissolve in the noise elimination apparatus of the embodiment 1 in accordance with the present invention. It is assumed here that the prescribed coefficient α in the integerization function of the foregoing expression (4) is 1/4 in the range where the absolute value of the difference value ($f_t-F_{t-1}$) is equal to or less than four, and is one in the ranges where it exceeds four as in FIG. 1 and FIG. 2.

Figure 6:
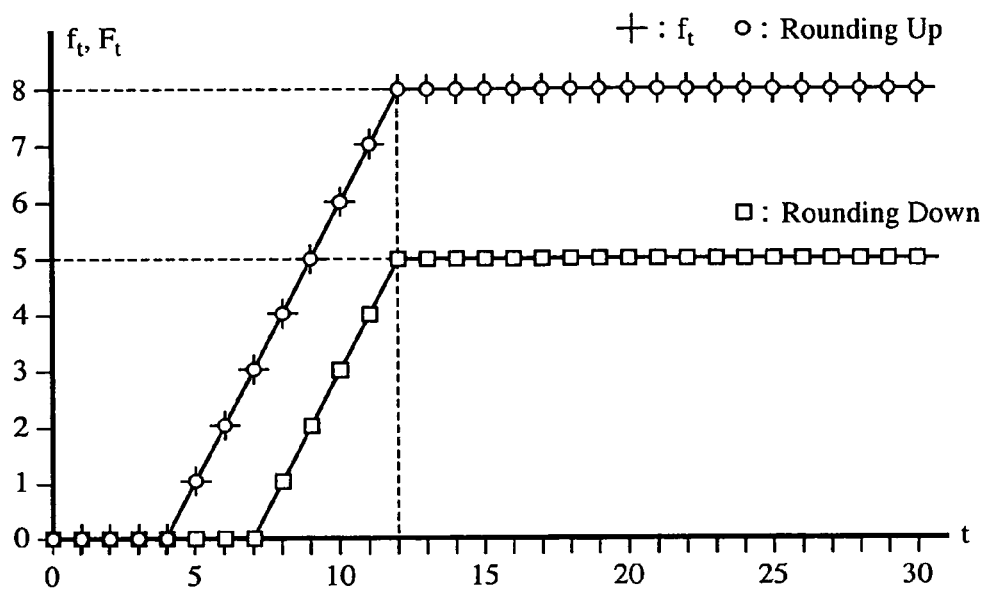
FIG. 6 is a diagram showing an example of input pixels in the transition due to a dissolve, and transition of output pixels and differences having undergone the noise elimination based on the rounding down processing and rounding up processing.
Figure 10:
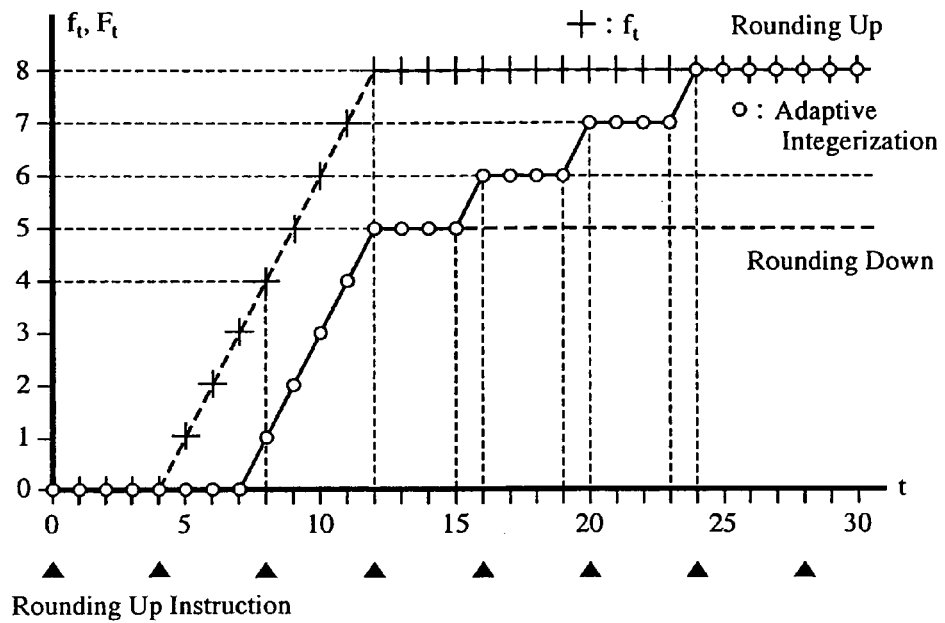
FIG. 10 is a diagram showing an example of input pixels in transition due to a dissolve in the embodiment 1 in accordance with the present invention, and transition of output pixels and differences having undergone noise elimination by adaptive integerization of the input pixels.

As FIG. 6, FIG. 10 is a graph showing an example of the input pixel values $f_t$ in the image data at any given frame number t and of the pixel values $F_t$ having undergone the noise elimination. In the graph at the top of FIG. 10, crosses denote the input pixel values $f_t$ whose magnitude varies one by one from zero to eight over eight frames from t=5 to t=12, thereby making a transition to another still image. This example will be described.

When the adaptive integerization function of the present embodiment 1 in accordance with the present invention is applied, the pixel values $F_t$ having undergone the noise elimination for the input pixel values $f_t$ make a transition as indicated by circles in the graph at the top of FIG. 10. The difference values ($f_t-F_{t-1}$) in the transition process is denoted by circles in the graph at the bottom of FIG. 10.

Incidentally, thick broken lines in the graph at the top of FIG. 10 indicate the transition of the pixel values $F_t$ having undergone the noise elimination based on the rounding down processing and rounding up processing in the conventional noise elimination apparatus described in FIG. 6; and thick broken lines in the graph at the bottom of FIG. 10 indicate the difference values ($f_t-F_{t-1}$) in the transition process.

In the case where the difference value $d=f_t-F_{t-1}$ is equal to or less than four, the prescribed coefficient α=1/4 in the noise elimination calculation processing is applied. When d is 1-3, the difference after the calculation processing becomes less than one. In other words, from t=5 to t=7, the difference values having undergone the noise elimination calculation processing are subjected to the integerization by the rounding down processing, thereby resulting in the integerized difference values of zero. Thus, according to the foregoing expression (3) that uses (1−K) as the prescribed coefficient α, $F_t$ becomes $F_t=F_{t-1}$.

Next, in the range from t=8 to t=12, d takes a value d=4, and it is integerized by the rounding up processing at t=8 and t=12, and by the rounding down processing at the remaining values. In this case, all the integerized difference values become one, and $F_t$ becomes $F_t=F_{t-1}+1$ according to the foregoing expression (3) as well.

In addition, in the range from t=13 to t=16, d takes a value d=3, and it is integerized by the rounding down processing up to t=15, in which case the integerized difference value becomes zero, and according to the foregoing expression (3), $F_t$ becomes $F_t=F_{t-1}$. At t=16, it is integerized by the rounding up processing, in which case the integerized difference value becomes one, and according to the foregoing expression (3), $F_t$ becomes $F_t=F_{t-1}+1$. Although the input pixel value $f_t$ completes the transition and takes a fixed value, the difference value between the input pixel value and the pixel value of the previous frame having undergone the noise elimination is reduced by one, thereby alleviating afterimages.

Likewise, in the range from t=17 to t=20 where d takes a value d=2 and in the range from t=21 to 24 where d takes a value d=1, it is integerized by the rounding up processing at t=20 and t=24, in which case the integerized difference value becomes one. Thus, the difference values between the input pixel values and the pixel values of the previous frame having undergone the noise elimination are reduced one by one, thereby eliminating afterimages at t=25 in the end.

In this way, as for the period N for applying the rounding up processing in which the integerization based on the rounding up processing is applied, it is possible to mention that the difference value that causes afterimages at the completion of the transition of the input pixel value $f_t$ is reduced one by one at each period (N).

In this case, the transition state alters because the input pixel values $f_t$, which make transition due to a dissolve, translate in the horizontal direction and the applying positions of the integerization based on the rounding up processing change. However, unlike the noise elimination according to the integerization that applies only the rounding down processing as described in the background art, the present embodiment 1 can reach $F_t=f_t$ through the periodic rounding up processing as long as the difference value is present, thereby being able to eliminate afterimages. In addition, in spite of the expansion and contraction in the vertical axis, the afterimages can also be eliminated even through the convergence time up to the elimination of the afterimage will change.

As for the prescribed coefficient α of the noise elimination calculation processing and the period N for applying the rounding up processing in the integerization function, they can be set independently of each other. In addition, as for the threshold in the nonlinear characteristics shown in FIG. 1 and FIG. 2, it can be set independently of the prescribed coefficient α, and the period N applied.

As described above, the present embodiment 1 in accordance with the present invention has the adaptive integerization processing section 13a that adaptively applies, as the integerization function, one of the rounding down processing and rounding up processing to the difference values having undergone the noise elimination calculation processing. As a result, it offers an advantage of being able to remove the minute noise and to eliminate the afterimages at the same time.

Embodiment 2

In an embodiment 2 in accordance with the present invention, a noise elimination apparatus will be described which has an adaptive integerization processing section that stores in a fraction memory fractions rounded down in the integerization of the corresponding pixels of the previous frame, and applies the integerization after reflecting the fractions of the previous frame on the real values removed by the noise elimination.

Figure 11:
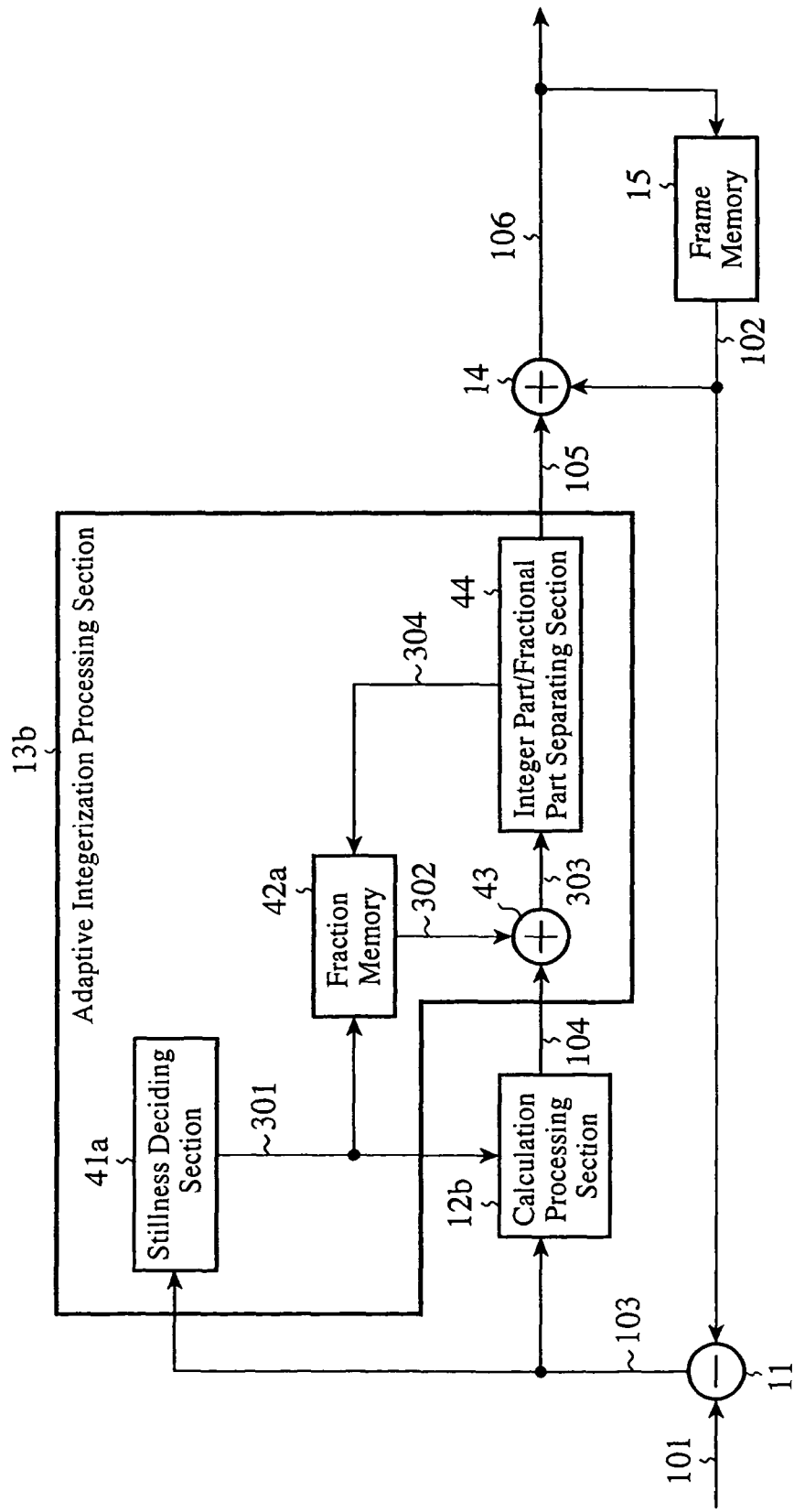
FIG. 11 is a block diagram showing a configuration of a noise elimination apparatus of an embodiment 2 in accordance with the present invention.

FIG. 11 is a block diagram showing a configuration of a noise elimination apparatus of the embodiment 2 in accordance with the present invention. The noise elimination apparatus has a subtracting section 11, a calculation processing section 12b, an adaptive integerization processing section 13b, an adding section 14 and a frame memory 15. The subtracting section 11, adding section 14 and frame memory 15 are the same as their counterparts shown in FIG. 7 of the foregoing embodiment 1.

The adaptive integerization processing section 13b includes, as a more detailed internal configuration, a stillness deciding section 41a, a fraction memory 42a, a real number adding section 43, and an integer part/fractional part separating section 44.

Referring to FIG. 11, the operation will be described of the noise elimination apparatus with the adaptive integerization processing section 13b of the embodiment 2 in accordance with the present invention.

As in the foregoing embodiment 1, the subtracting section 11 takes differences, at the corresponding positions, between image data ($f_t$) 101 of a frame which is an input image and image data ($F_{t-1}$) 102 of a first previous frame which is stored in the frame memory 15 as a reference image, and outputs ($f_t - F_{t-1}$) as difference values (d) 103 including noise components.

If the stillness deciding section 41a of the adaptive integerization processing section 13b which will be described later obtains a decision result 301 that the input image data 101 is a still image portion, the calculation processing section 12b multiplies the difference value (d) 103 output from the subtracting section 11 by the prescribed coefficient $\alpha(0<\alpha<1)$ in the foregoing expression (4), 1/4 as in the foregoing embodiment 1 here, and outputs the difference value (d') 104 having undergone the noise elimination calculation processing. Unless the stillness deciding section 41a obtains the decision result 301 that the input image data ($f_t$) 101 is a still image portion, the calculation processing section 12b considers the difference value (d) 103 output from the subtracting section 11 as the difference value (d') 104 having undergone the noise elimination calculation processing, and outputs it.

As for the difference value (d') 104 output when the decision result 301 that the input image data ($f_t$) 101 is not a still image portion is obtained, although it remains an integer substantially, it can also be interpreted that the difference value (d) 103 is multiplied by one as the prescribed coefficient $\alpha$ and is made a real value.

The adaptive integerization processing section 13b performs the adaptive integerization which will be described below on the difference value (d') 104 having undergone the noise elimination calculation processing by the calculation processing section 12b, and outputs the integerized difference value 105.

The adding section 14 adds the integerized difference value 105 output from the adaptive integerization processing section 13b and the image data ($F_{t-1}$) 102 of the first previous frame stored in the frame memory 15 to obtain output image data ($F_t$) 106 having undergone the noise elimination. The frame memory 15 stores the output image data ($F_t$) 106 having undergone the noise elimination as in the foregoing embodiment 1.

In this way, the noise elimination apparatus with the adaptive integerization processing section 13b in the embodiment 2 in accordance with the present invention operates. Next, the detailed operation of the adaptive integerization processing section 13b will be described.

The adaptive integerization processing section 13b comprises the stillness deciding section 41a, the fraction memory 42a, the real number adding section 43, and the integer part/fractional part separating section 44; and the difference value (d) 103, which is the input to the adaptive integerization processing section 13b, is input to the stillness deciding section 41a, and the difference value (d') 104 having undergone the noise elimination calculation processing is input to the real number adding section 43. In addition, the integerized difference value 105, which is the output from the adaptive integerization processing section 13b, is output from the integer part/fractional part separating section 44.

First, the stillness deciding section 41a makes a decision from the difference value (d) 103 output from the subtracting section 11 as to whether the input image data ($f_t$) 101 is a still image portion or not, and outputs the decision result 301. In this case, the stillness deciding section 41a makes a decision, for example, that the input image data 101 is a still image portion when the absolute value of the difference value (d) 103 is less than a threshold, and that the input image data 101 is not a still image portion when the absolute value is equal to or greater than the threshold. The decision that it is not a still image portion is considered to be equivalent to the decision that it is a moving image portion. The decision threshold is set at four, for example.

The fraction memory 42a, which is a memory for retaining, at respective pixel positions, fractions $C_{t-1}$ in decimal places which are rounded down at the time of integerization of the first previous frame in the integer part/fractional part separating section 44, retains the fractions in decimal places as long as the decision result 301 by the stillness deciding section 41a is a still image portion, and resets the fractions in decimal places to zero unless the decision result 301 is a still image portion, thereby causing to be referred to. Here, as for the accuracy of the fractions retained in the fraction memory 42a, if the prescribed coefficient $\alpha$ is a reciprocal of a power of two (assumed to be the Sth power), it is enough to retain the S digits of the numerical value representing the exponent part. For example, when the prescribed coefficient $\alpha$ is 1/4, it has two decimal places. In the case of the reciprocal of a power of two, the number of digits less than S digits is possible if the rounding down error due to cancellation of significant digits is allowable. In the case of not the reciprocal of a power of two, any appropriate number of digits can be used if the rounding down error of lower decimal places of the fractions retained is allowable. In the case of handling both the positive and negative difference values, it is assumed that one extra digit is retained to memorize the plus and minus sign.

The real number adding section 43 adds the difference value (d') 104 having undergone the noise elimination calculation processing by the calculation processing section 12b and the fraction ($C_{t-1}$) 302 in decimal places of the first previous frame retained in the fraction memory 42a, and outputs the addition result as a real number difference value (d'+$C_{t-1}$) 303.

Here, the fraction ($C_{t-1}$) 302 added has been reset to zero before the addition unless the stillness deciding section 41a makes a decision that the input image data ($f_t$) 101 is a still image portion.

The integer part/fractional part separating section 44 separates the real number difference value 303 into the integer part constituting an integerized difference value (d") 105 and the fractions ($C_t$) 304 in decimal places, and outputs the integer part constituting the integerized difference value (d") 105 to the adding section 14 and outputs the fraction ($C_t$) 304 in decimal places to the fraction memory 42a. The fraction ($C_t$) 304 in decimal places is retained in the fraction memory 42a to be used for calculating the real number difference value 303 at the same pixel position of the next frame.

When the stillness deciding section 41a does not make a decision that the input image data ($f_t$) 101 is a still image portion, the difference value (d') 104 having undergone the noise elimination calculation processing by the calculation processing section 12b is an integer difference value (d) 103 in practice, and the fraction ($C_{t-1}$) 302 retained in the fraction memory 42a is also reset before the addition by the real number adding section 43 so that the fraction ($C_t$) 304 retained in the fraction memory 42a becomes zero.

Figure 12:
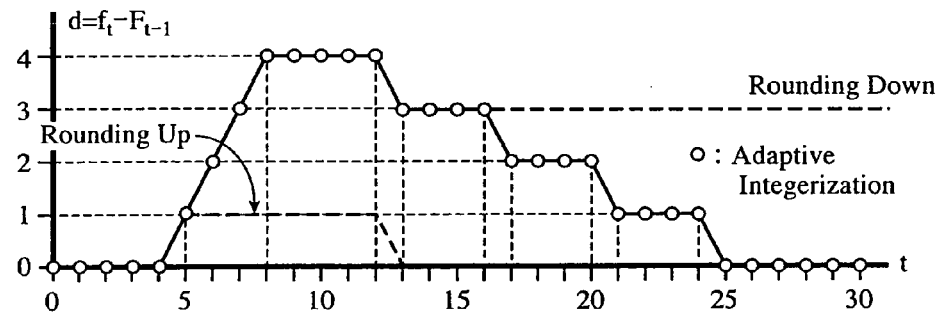
FIG. 12 is a diagram showing output process for input when the difference value is one in the noise elimination apparatus of the embodiment 2 in accordance with the present invention.

In this configuration, the operation in the case where noise with magnitude 1 occurs in the image data of any given frame number t will be described with reference to FIG. 12. Assume that x is an integer, in which case the input image data is given by $f_t$=x+1, and the reference image data by $F_{t-1}$=x. The difference value (d) 103 in the subtracting section 11 is one, and undergoes multiplication processing in accordance with the nonlinear characteristics. When the prescribed coefficient α=1/4, the calculation processing section 12 outputs, when the difference value (d) 103 is one, 0.25 as the difference value (d') 104 having undergone the noise elimination calculation processing in accordance with the foregoing expression (4) as in the foregoing embodiment 1.

The fraction memory 42a stores some fractions ($C_{t-1}$) 302 processed in the first previous frame, and when the prescribed coefficient α=1/4, they take one of the values given by $C_{t-1}$=0.00, 0.25, 0.50, and 0.75 at every 0.25 step. For the fractions ($C_{t-1}$) 302 from 0 to 0.50, since the real number difference value (d'+$C_{t-1}$) 303 output from the real number adding section 43 is less than one, the integerized difference value (d") 105 consisting of the integer part output from the integer part/fractional part separating section 44 is zero, and the fraction ($C_t$) 304 consisting of the fractional part output takes one of the values 0.25, 0.50, and 0.75. Thus, it has the effect equivalent to the integerization based on the rounding down processing as the output of the adaptive integerization processing section 13b. In contrast, when $C_{t-1}$=0.75, the real number difference value (d'+$C_{t-1}$) 303 is one, the integerized difference value (d") 105 of the integer part is one, and the fraction ($C_t$) 304 of the fractional part is 0.00. This brings about the effect equivalent to the integerization based on the rounding up processing as the output of the adaptive integerization processing section 13b. As described in the foregoing embodiment 1, the integerization corresponding to the rounding up processing cannot achieve the noise elimination. However, when the prescribed coefficient α=1/4, and if the output fraction ($C_t$) 304 of the fractional part of the integer part/fractional part separating section 44 and the fraction ($C_{t-1}$) 302 output from the fraction memory 42a, both of which take value at every 0.25 step, occur equally, the minute noise can be eliminated at a ratio of 3/4.

The foregoing is the description of the effect of the adaptive integerization on the removal of minute noise in the embodiment 2 in accordance with the present invention.

Next, the effect of the adaptive integerization on the removal of minute noise will be described when shifting from a certain still image to another different still image in the transition such as a dissolve in the noise elimination apparatus of the embodiment 2 in accordance with the present invention. It is assumed here that the prescribed coefficient α in the integerization function of the foregoing expression (4) is 1/4 when a decision of a still image portion is made from the difference value ($f_t$-$F_{t-1}$), and is one unless a decision of a still image portion is made.

Figure 13:
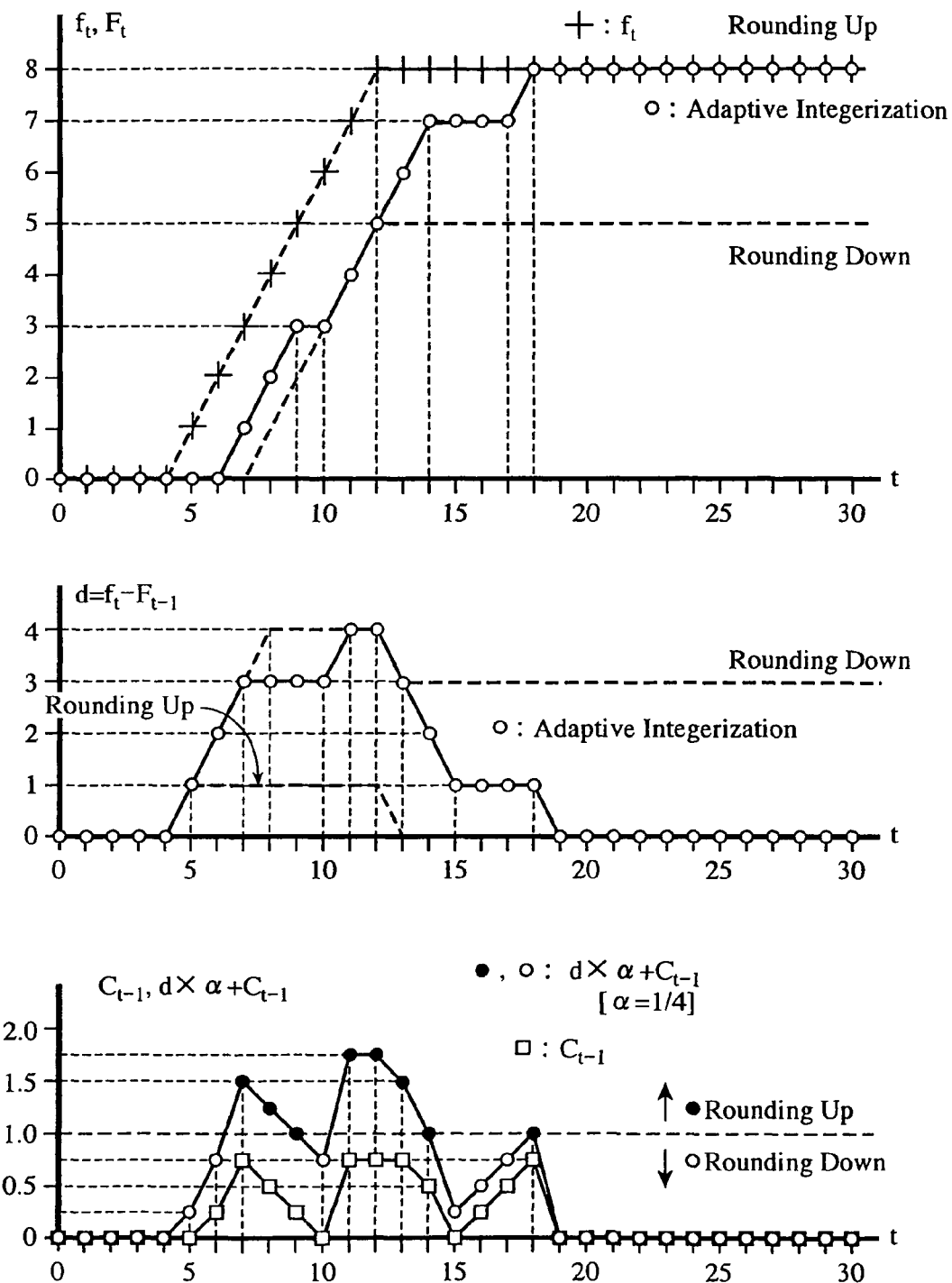
FIG. 13 is a diagram showing an example of input pixels in transition due to a dissolve in the embodiment 2 in accordance with the present invention, and transition of output pixels and differences and fractions having undergone noise elimination by adaptive integerization of the input pixels.

As FIG. 10, FIG. 13 is a graph showing an example of the input pixel values $f_t$ in the image data at any given frame number t and of the pixel values $F_t$ having undergone the noise elimination. In the graph at the top of FIG. 13, crosses denote the input pixel values $f_t$ whose magnitude varies one by one from zero to eight over eight frames from t=5 to t=12, thereby making a transition to another still image. This example will be described.

When the adaptive integerization function of the present embodiment 2 in accordance with the present invention is applied, the pixel values $F_t$ having undergone the noise elimination for the input pixel values $f_t$ make a transition as indicated by circles in the graph at the top of FIG. 13. The difference values ($f_t$-$F_{t-1}$) in the transition process is denoted by circles in the graph at the middle of FIG. 13. In addition, the fractions ($C_{t-1}$) of the first previous frame in the transition process are denoted by squares in the graph at the bottom of FIG. 13, and the real number difference values (d×α+$C_{t-1}$) that are obtained by reflecting the fractions ($C_{t-1}$) on the difference value (d×α) having undergone the noise elimination calculation processing are indicated by circles.

Incidentally, as in the embodiment 1 in accordance with the present invention, thick broken lines in the graph at the top of FIG. 13 indicate the transition of the pixel values $F_t$ having undergone the noise elimination based on the rounding down processing and rounding up processing in the conventional noise elimination apparatus described in FIG. 6; and thick broken lines in the graph at the middle of FIG. 13 indicate the difference values ($f_t$-$F_{t-1}$) in the transition process.

When a decision is made that the difference value d in the middle graph is a still image portion, the real number difference value (d×α+$C_{t-1}$) denoted by a circle in the bottom graph takes a value equal to the square fraction $C_{t-1}$ plus (d/4) if the prescribed coefficient α for carrying out the noise elimination calculation processing is 1/4. The integer part of the real number difference value (d×α+$C_{t-1}$) before the integerization becomes the integerized difference value after the adaptive integerization. Thus, when the real number difference value exceeds one, the integerized difference value is one, and a portion exceeding one is the fraction $C_t$. In addition, when the real number difference value is less than one, the integerized difference value is zero, and the difference value itself is the fraction $C_t$. The fractions $C_t$ of the current frame t obtained in this manner become the fractions of the next frame (t+1), which are denoted by squares. Accordingly, in the bottom graph, concerning the frame indicated by solid circles, the rounding up processing is carried out, and concerning the frame indicated by open circles, the rounding down processing is carried out, thereby producing the output pixel values $F_t$ having undergone the noise elimination.

The present embodiment 2 in accordance with the present invention does not always result in the integerization based on the fixed period rounding down processing and rounding up processing as in the embodiment 1 in accordance with the present invention. However, the rounding up processing that occurs appropriately from t=7 can achieve $F_t=f_t$ at t=18, thereby being able to eliminate afterimages.

As described above, the present embodiment 2 in accordance with the present invention has the adaptive integerization processing section 13b that stores in the fraction memory 42a the fractions rounded down in the integerization of the corresponding pixels of the previous frame, and applies the integerization after reflecting the fractions on the real values removed by the noise elimination. Thus, the present embodiment 2 has an advantage of being able to remove the minute noise and to eliminate the afterimages at the same time.

In addition, the present embodiment 2 retains the rounded down fractions of the corresponding pixels of the previous frame in the fraction memory 42a, and carries out integerization by separating the integer part after adding the fractions to the real values having undergone the noise elimination by the calculation processing section 12b. Thus, even if the integerization function applied includes only the rounding down processing, the present embodiment 2 has an advantage equivalent to the integerization using the rounding up processing for the real values having undergone the noise elimination by the calculation processing section 12b.

Embodiment 3

In the embodiment 3 in accordance with the present invention, a noise elimination apparatus will be described in which the calculation processing section includes the functions corresponding to those of the stillness deciding section in the adaptive integerization processing section in the foregoing embodiment 2.

Figure 14:
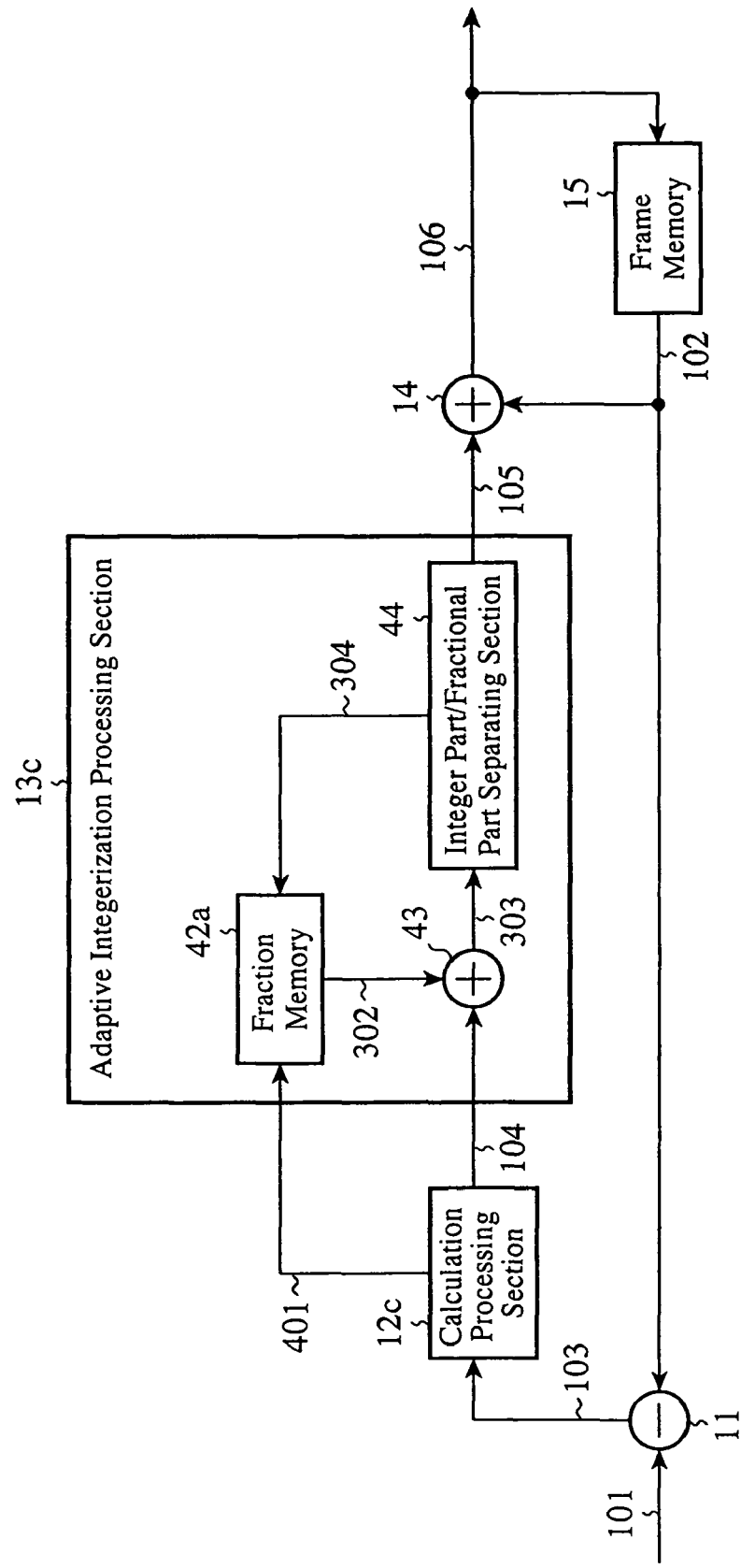
FIG. 14 is a block diagram showing a configuration of a noise elimination apparatus of an embodiment 3 in accordance with the present invention.

FIG. 14 is a block diagram showing a configuration of the noise elimination apparatus of the embodiment 3 in accordance with the present invention. The noise elimination apparatus has a subtracting section 11, a calculation processing section 12c, an adaptive integerization processing section 13c, an adding section 14 and a frame memory 15. The subtracting section 11, adding section 14 and frame memory 15 are the same as their counterparts shown FIG. 11 in the foregoing embodiment 2.

The adaptive integerization processing section 13c includes, as a more detailed internal configuration, a fraction memory 42a, a real number adding section 43, and an integer part/fractional part separating section 44; and is the same as that shown in FIG. 11 of the foregoing embodiment 2 except that the stillness deciding section 41a is removed.

In FIG. 14, the calculation processing section 12c, which includes the function corresponding to that of the stillness deciding section 41a of the foregoing embodiment 2, obtains a decision result 401 by that function; outputs the difference value (d') 104 having undergone the noise elimination calculation processing in the same manner as the calculation processing section 12b in the foregoing embodiment 2, which multiplies the difference value (d) 103 output from the subtracting section 11 by the prescribed coefficient; and outputs the decision result 401 to the fraction memory 42a as well.

The operation of the fraction memory 42a that obtains the decision result 401 and the operation of the noise elimination apparatus from that point forward are the same as the description about the fraction memory 42a that obtains the decision result 301 in the foregoing embodiment 2.

As described above, the present embodiment 3 in accordance with the present invention has the same advantage as the foregoing embodiment 2, as the noise elimination apparatus with the configuration having the calculation processing section 12c including the stillness deciding section 41a located in the adaptive integerization processing section 13b of the foregoing embodiment 2.

Embodiment 4

In the present embodiment 4 in accordance with the present invention, the noise elimination apparatus will be described which makes independent the decision results the stillness deciding section of the foregoing embodiment 2 outputs and supplies to the calculation processing section and to the fraction memory.

Figure 15:
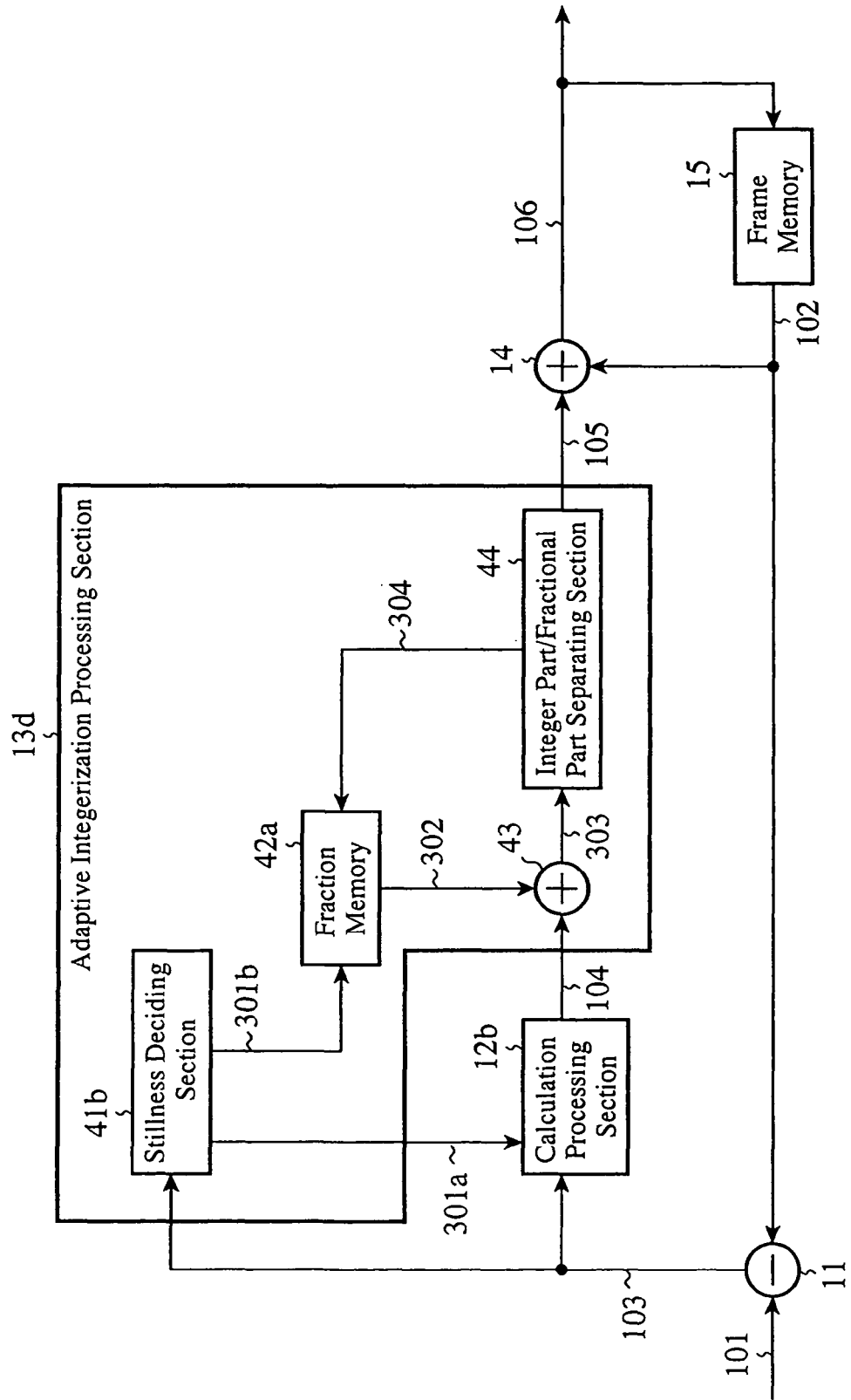
FIG. 15 is a block diagram showing a configuration of a noise elimination apparatus of an embodiment 4 in accordance with the present invention.

FIG. 15 is a block diagram showing a configuration of the noise elimination apparatus of the embodiment 4 in accordance with the present invention. The noise elimination apparatus has a subtracting section 11, a calculation processing section 12b, an adaptive integerization processing section 13d, an adding section 14 and a frame memory 15. The subtracting section 11, adding section 14 and frame memory 15 are the same as their counterparts shown in FIG. 11 of the foregoing embodiment 2.

The adaptive integerization processing section 13d includes, as a more detailed internal configuration, a stillness deciding section 41b, a fraction memory 42a, a real number adding section 43, and an integer part/fractional part separating section 44; and is the same as that shown in FIG. 11 of the foregoing embodiment 2 except that the outputs from the stillness deciding section 41b to the calculation processing section 12b and to the fraction memory 42a are made independent.

In the foregoing embodiment 2, the stillness deciding section 41a makes a decision from the difference value 103 output from the subtracting section 11 as to whether the input image data 101 is a still image portion or not, and outputs the decision result 301. In the embodiment 4 in accordance with the present invention, the stillness deciding section 41b divides the reliability of the decision on the still image portion into two or more grades, notifies the calculation processing section 12b, and prepares a plurality of prescribed coefficients α for the noise elimination calculation processing in accordance with the classification. For example, the stillness deciding section 41b, which makes a decision from the difference value 103 output from the subtracting section 11, considers that the probability of not the still image portion becomes higher as the difference value increases. Thus, the reliability of making a decision that the input image data 101 is a still image portion decreases, and the effect of the noise on the image data reduces.

Accordingly, the difference value 103 is divided into a plurality of intervals using thresholds, and the prescribed coefficients α are increased to closer to one as the probability of not the still image portion increases using the intervals as the classification. For example, as the nonlinear characteristics for providing the prescribed coefficients, the intervals and the prescribed coefficients can be set rather freely such as: the prescribed coefficient α=1/4 in the interval from −2 to 2 inclusive, and α=1/2 in the intervals from −4 to −2 inclusive or from 2 to 4 inclusive, in which a decision is made that the difference value 103 corresponds to the still image portion; and α=1 in the remaining intervals in which a decision is made that the difference value 103 does not correspond to the still image portion.

As in the foregoing embodiment 2, when it makes the decision of not the still image portion as a decision result 301b, the stillness deciding section 41a notifies the fraction memory 42a to reset the fraction 302 via a route separate from the decision result 301a.

Thus, the noise elimination apparatus operates in the same manner as described in the foregoing embodiment 2 except that the stillness deciding section 41b supplies the calculation processing section 12b with the decision result 301a, and the fraction memory 42a with the decision result 301b; and that the calculation processing section 12b applies the prescribed coefficients α based on the decision result 301a.

In the embodiment 4 in accordance with the present invention, the decision results of the stillness deciding section supplied to the calculation processing section and fraction memory are described separately. However, enabling the fraction memory to distinguish a specified decision result to the calculation processing section from the other makes it possible to implement equivalent operation in FIG. 11 of the foregoing embodiment 2.

As described above, the embodiment 4 in accordance with the present invention offers the same advantages as the foregoing embodiment 2, as the noise elimination apparatus with the configuration of dividing the nonlinear characteristics of the calculation processing section 12b of the foregoing embodiment 2 into three or more states.

In addition, the present embodiment 4 in accordance with the present invention uses different prescribed coefficients for different divisions of the nonlinear characteristics defined by dividing the probability of making a decision of the still image portion into three or more states based on the difference value output from the subtracting section 11. Accordingly, the present embodiment 4 can assign a different prescribed coefficient to an intermediate portion between the still image portion and not the still image portion, can make it easier for the output of the real number adding section 43 to exceed one because of an increase in the fraction for the difference value, and can facilitate applying the integerization corresponding to the rounding up processing, thereby offering an advantage of being able to improve the delay.

Embodiment 5

In the present embodiment 5 in accordance with the present invention, a noise elimination apparatus will be described which improves the decision reliability by enabling the stillness deciding section of the foregoing embodiment 2 to refer to the decision result on neighboring image data at the time of making the decision.

Figure 16:
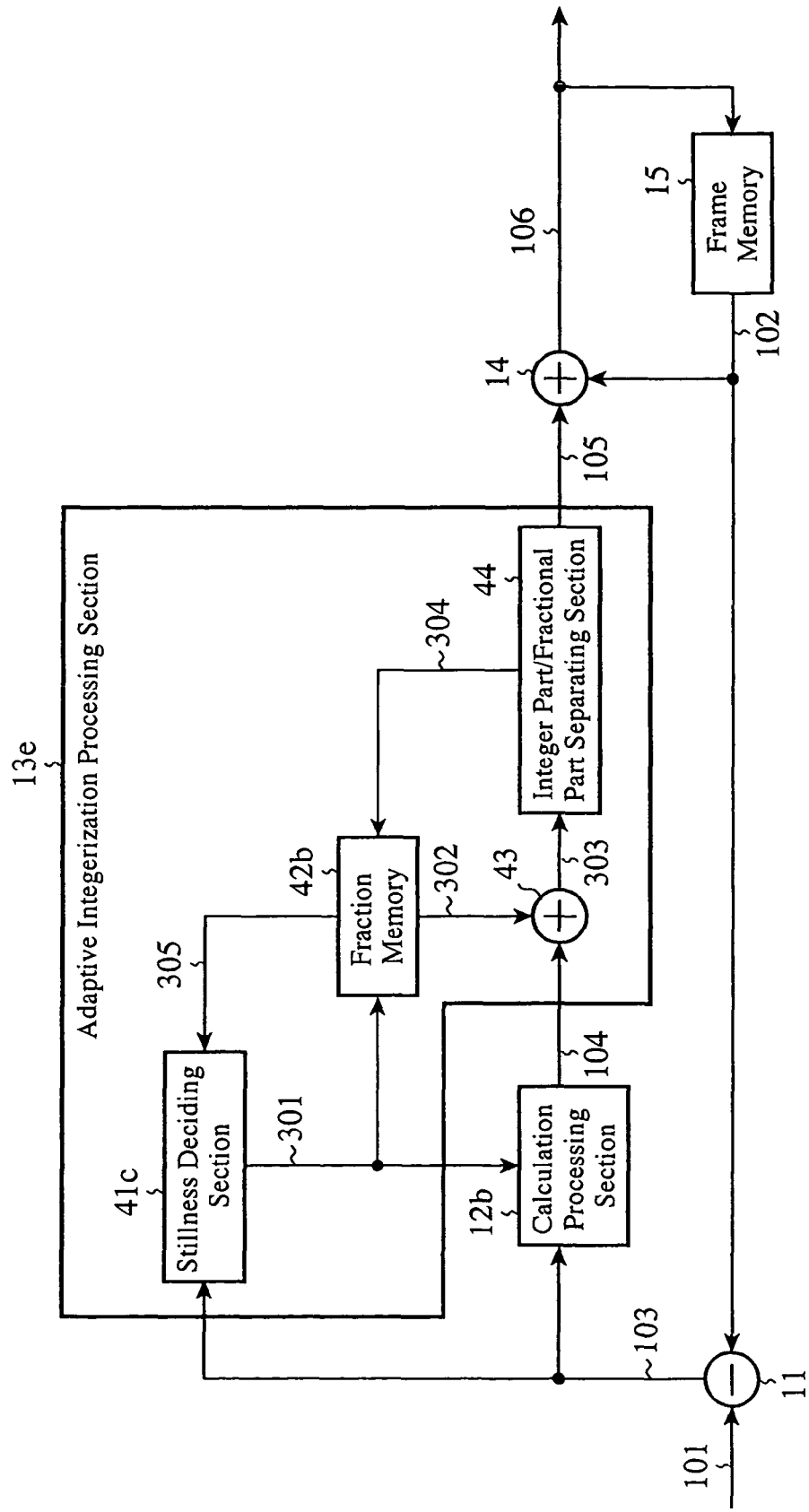
FIG. 16 is a block diagram showing a configuration of a noise elimination apparatus of an embodiment 5 in accordance with the present invention.

FIG. 16 is a block diagram showing a configuration of the noise elimination apparatus of the embodiment 5 in accordance with the present invention. The noise elimination apparatus has a subtracting section 11, a calculation processing section 12b, an adaptive integerization processing section 13e, an adding section 14 and a frame memory 15, and the subtracting section 11, adding section 14 and frame memory 15 are the same as their counterparts shown in FIG. 11 of the foregoing embodiment 2.

The adaptive integerization processing section 13e includes, as a more detailed internal configuration, a stillness deciding section 41c, a fraction memory 42b, a real number adding section 43, and an integer part/fractional part separating section 44; and is the same as that shown in FIG. 11 of the foregoing embodiment 2 except that the stillness deciding section 41c refers to fractions of adjacent image data from the fraction memory 42b.

The embodiment 5 in accordance with the present invention, utilizing the fact that the fraction memory 42b is reset to zero when the stillness deciding section 41c does not make a decision of the still image portion, makes a conjecture as to whether the input image data is a still image portion or not by referring to the retained fractions of the adjacent image data that have processed in the same frame, or of the adjacent image data that have not yet processed in the same frame, but correspond to those in the previous frame, thereby increasing the reliability of the decision. Referring to the fractions of the plurality of adjacent image data, the stillness deciding section 41c makes a conjecture that the input image data is not a still image portion if the fractions are zero. It is also possible to refer to the fraction at the same position in the previous frame before the reset based on the decision result is applied. For example, the stillness deciding section 41c makes a final decision whether the input image data is a still image portion or not according to the ratio of zeros therein and the magnitude of the difference value 103.

In addition, as in the foregoing embodiment 4, it is also possible to classify the decision reliability, and to make a decision on the classification by referring to the fractions of the adjacent image data.

As described above, the present embodiment 5 in accordance with the present invention can increase the reliability of the decision of the stillness deciding section 41a in the adaptive integerization processing section 13b of the foregoing embodiment 2, thereby being able to achieve an advantage similar to that of the foregoing embodiment 2.

The embodiments 1-5 in accordance with the present invention are described by way of example in which the minute noise is positive. However, it is obvious that if it is negative, the same advantage can be obtained by making a decision of the integerization by taking the absolute value of the negative minute noise. In addition, the minute noise is not limited to 1 or −1.

The embodiments 1-5 in accordance with the present invention are described by way of example that applies as the characteristics of the calculation processing section the example shown in FIG. 1 and FIG. 2. However, it is not essential that the characteristics are symmetric with respect to the difference value 0 and limited to the neighborhood of zero, but the characteristics can be set in a broader range.

In addition, in the embodiments 1-5 in accordance with the present invention, according to a trend such as an increase, decrease, convergence and stagnation of the difference value in the calculation processing section, which is obtained from the secondary difference (derivative) value, the prescribed coefficients can be set separately within the same threshold interval.

INDUSTRIAL APPLICABILITY

As described above, the noise elimination apparatus in accordance with the present invention is suitably applied to such devices that have to prevent afterimages and to eliminate minute noise, for example.

What is claimed is:
1. A noise elimination apparatus comprising:
   a subtracting section for obtaining a difference value between input image data and reference image data;
   a calculation processing section for carrying out calculation processing of multiplying the difference value obtained by said subtracting section by a prescribed coefficient;
   an adaptive integerization processing section for obtaining an integerized difference value by adaptively perform- ing rounding up processing or rounding down processing on the difference value having undergone the calculation processing by said calculation processing section;

an adding section for obtaining output image data on the basis of the integerized difference value obtained by said adaptive integerization processing section and the reference image data; and a memory for storing the output image data obtained by said adding section as the reference image data.

2. The noise elimination apparatus according to claim 1, wherein said adaptive integerization processing section comprises:

an integerization control section for instructing to carry out the rounding up processing or rounding down processing in accordance with a count value of a frame and a period set for performing rounding up; and a rounding up/down processing section for performing the rounding up processing or rounding down processing of the difference value having undergone the calculation processing by said calculation processing section in accordance with the instruction of said integerization control section.

3. The noise elimination apparatus according to claim 2, wherein said integerization control section instructs to carry out the rounding up processing when a remainder of dividing the count value of the frame by the period set for carrying out the rounding up becomes a prescribed value, and to carry out the rounding down processing unless the remainder becomes the prescribed value.

4. The noise elimination apparatus according to claim 1, wherein said adaptive integerization processing section comprises:

a stillness deciding section for making a decision from the difference value obtained by said subtracting section as to whether the input image data is a still part or not;

a real number adding section for adding a fraction in decimal places of the reference image data and the difference value having undergone the calculation processing by said calculation processing section;

an integer part/fractional part separating section for separating a real number difference value obtained by said real number adding section into an integerized difference value consisting of an integer part and a fraction in decimal places; and a fraction memory for retaining the fraction separated by said integer part/fractional part separating section, and for outputting the fraction retained to said real number adding section when said stillness deciding section makes a decision that the input image data is a still part.

5. The noise elimination apparatus according to claim 4, wherein said calculation processing section performs calculation processing of multiplying the difference value obtained by said subtracting section by a prescribed coefficient based on a decision result by said stillness deciding section.

6. The noise elimination apparatus according to claim 4, wherein said fraction memory resets the fraction in decimal places retained in said fraction memory unless a decision is made from a decision result of said stillness deciding section that the image data of a prescribed input frame is a still part.

7. The noise elimination apparatus according to claim 4, wherein said stillness deciding section makes a final decision based on a first decision and a second decision, said first decision being a conjecture as to whether the reference image data is a still part or not according to the fraction retained in said fraction memory, and said second decision being a conjecture as to whether the input image data is a still part or not according to the difference value obtained by said subtracting section.

8. A noise elimination method comprising:

a subtracting step of obtaining a difference value between input image data and reference image data;

a calculation processing step of carrying out calculation processing of multiplying the difference value obtained by the subtracting step by a prescribed coefficient;

an adaptive integerization processing step of obtaining an integerized difference value by adaptively performing rounding up processing or rounding down processing on the difference value having undergone the calculation processing by the calculation processing step;

an adding step of obtaining output image data on the basis of the integerized difference value obtained by the adaptive integerization processing step and the reference image data; and a storing step of storing the output image data obtained by the adding step as the reference image data.

* * * * *